United States Patent Office 3,282,775
Patented Nov. 1, 1966

3,282,775
SPORICIDAL COMPOSITIONS COMPRISING A SATURATED DIALDEHYDE AND A CATIONIC SURFACTANT
Albert Adam Stonehill, Plainfield, N.J., assignor to Ethicon, Inc., a corporation of New Jersey
No Drawing. Filed May 10, 1963, Ser. No. 279,588
11 Claims. (Cl. 167—22)

This invention relates to improved chemical sterilization compositions and to methods for sterilizing with these compositions.

The sterilization compositions of the present invention comprise a saturated dialdehyde containing from 2 to 6 carbon atoms and a cationic surface active agent. The compositions may be used in either aqueous or alcoholic solutions and are able to kill sporulating bacteria over a wide pH range. Furthermore, the compositions of the present invention have little odor or toxicity and are stable for long periods of time.

Presently, steam sterilization is the most widely accepted method for disinfection. However, this method is impracticable in the disinfection of objects such as hospital beds, walls, floors or delicate instruments which are sensitive to elevated temperatures.

Many chemical sterilization methods have been developed as substitutes for steam sterilization but all of them have various shortcomings. The phenols and formaldehyde compositions have been used and have considerable bactericidal activity but both have objectionable odors and considerable toxicity. Ethanol, isopropyl alcohol and the quaternary ammonium compounds have been used, and though less odorous and toxic, lack the activity of the phenols and formaldehyde compositions.

Compositions comprising saturated dialdehydes with alkalinating agents have also been used. Such compositions are more fully described in U.S. Patent 3,016,328. Though such compositions are quite satisfactory as chemical sterilization agents their sporicidal activity is limited to certain pH ranges and they also have certain limits on stability.

Many chemical sterilization agents have the ability to kill vegetative bacteria but few are capable of killing spores such as *Clostridium welchii*, *Clostridium tetani*, *Bacillus subtilis* and *Bacillus globigii*. The efficacy of chemical sterilization agents is measured by their spectrum of activity, i.e., the type of spores that they kill; by the rate of killing such spores, i.e., the time it takes for the agent to kill the spore; and by the length of time over which the agent is active in killing such spores.

Few agents, if any, have a broad spectrum of kill as well as a fast rate of killing which lasts over an extended period of time. However, the compositions of the present invention have both. For example, an aqueous solution of two (2) grams of glutaraldehyde and 0.1 gram of di-isobutyl phenoxyethoxy ethyl dimethyl benzyl ammonium chloride per 100 ml. of solution, when tested in accordance with the official sporicidal test of the Association of Official Agricultural Chemists (A.O.A.C. 1961), kills all of the above mentioned spores in a period of less than about 0.5 hour.

The simple dialdehydes have found many uses in industrial applications and in fact have been used in the disinfectant field. Solutions of the simple dialdehydes are useful as sterilizing agents and have been found to have activity at certain alkaline pH's. The rate of killing with such alkaline solutions of dialdehydes, when tested in accordance with the official sporicidal test of the A.O.A.C., is approximity three (3) hours or more.

Some cationic surface active agents such as quaternary ammonium compounds have some germicidal activity against gram positive and gram negative organisms but they lack any appreciable sporicidal activity and are not acceptable as sterilizing agents. For example, an aqueous solution of 0.1% di-isobutyl phenoxyethoxy ethyl dimethyl benzyl ammonium chloride has very little effect on the spores previously described even after six (6) hours when tested according to the official sporicidal test of the A.O.A.C.

The improvement of the present invention resides in the discovery of combinations of saturated dialdehydes and cationic surface active agents which have broad spectrums of sporicidal activity and, surprisingly, an extremely fast rate of killing.

The compositions of the present invention have a low surface tension and readily enter, flood and disinfect hard-to-get-at places such as cracks, crevices and capillaries and are able to kill those spores generally protected by their surroundings. Furthermore, the compositions of the present invention have detergency characteristics which enhance their sporicidal efficiency. The compositions have not only a broad spectrum of kill and a fast killing rate but are also effective against spores generally unaffected by any known chemical sterilizing solutions.

The saturated dialdehydes which may be employed in the novel compositions of this invention are those containing from 2 to 6 carbon atoms. More specifically, these compounds include malonaldehyde, succinaldehyde, oxaldehyde (glyoxal), adipaldehyde and preferably, glutaraldehyde. Further, the dialdehyde may be in its basic form or in the form of an adduct, such as an alkali metal bisulfite adduct, i.e., glutaraldehyde bisulfite, or in other forms well-known in the art.

The quantity of saturated dialdehyde which may be used in the claimed compositions may vary from about 0.1% to about 2% depending upon which particlular dialdehyde is selected. Moreover, one may safely depart from this concentration without seriously detracting from its effectiveness. For example, if desired, the final concentration of dialdehyde may be increased up to as much as 10% or decreased as low as 0.05%. However, amounts in excess of 2% are unnecessary and wasteful. In actual practice a range of from .1% to about 2% is preferred.

The cationic surface active agents which may be used in the novel compositions of the present invention are the aliphatic or fatty amines and their derivatives such as dodecylamine, hexadecylamine, hexadecylamine hydrochloride; homologs of aromatic amines having fatty chains such as dodecyl aniline; fatty amides derived from aliphatic diamines or disubstituted diamines such as oleylaminodiethylamine; amides obtained from amino alcohols and their quaternary ammonium derivatives such as the fatty acid hydroxyethyl amides; quaternary ammonium bases derived from the fatty amides of disubstituted diamines such as oleyl methylamino ethylene diethylamine methyl sulfate, oleyl benzylamino ethylene diethyamine hydrochloride; fatty amides derived from benzimidazolines such as the alkylated benzimidazolines made by the condensation of fatty acids with aliphatic diamines; basic pyridinium compounds and their salts such as the sulfate of lauryl pyridinium, octadecyl methylene pyridinium acetate; basic sulfonium, phosphonium and antimonium compounds such as the methyl sulfate of dimethyloctadecyl sulfonium; betaine compounds of quaternary ammonium such as betaine compound of diethyl aminoacetic acid and octadecyl chloromethyl ether; the urethanes or basic salts of ethylene diamine such as the hydrochloride of menthol diurethane; polyethylene diamines and their quaternary ammonium derivatives; polypropanol polyethanolamines; and preferably the quaternary ammonium salts having a hydrophobic group such as cetyltrimethyl ammonium chloride, alkyldimethyl benzyl ammonium chloride, di-isobutyl phenoxyethoxy ethyldimethyl benzyl ammonium chloride, dimethylstearyl hydroxyethyl ammonium chloride, oleylmethyl aminoethylene diethylamine methyl sulfate, the chloride of the methyl ester of dimethyloctadecyl betaine, dimethylphenylbenzyl ammonium chloride, and the like.

The amount of surface activity present in the cationic agents used in the compositions of the present invention may be varied over wide limits and in some instances, at optimum conditions of temperature and concentration, compounds such as hexyltrimethyl ammonium bromide which has little surface activity may be used in accordance with the present invention.

It appears that the important factor which need be present in the compositions of the present invention is the positively charged non-metallic atom. Though, with care, anionic and non-ionic agents may be incorporated pH which may be readily changed to an alkaline pH by the addtion of minor amounts of alkalinating agents the anionics or non-ionics do not by themselves increase the sporicidal activity of the compositions or produce the other desired results, i.e., activity over a broad pH range, stability, etc.

The amount of cationic surface active agent used in the compositions of the present invention may vary from about 0.005% to about 1.0% with the preferred range being from about .01% to 0.1%. If less cationic surface active agent is used the spectrum of sporicidal activity is narrowed and the rate of killing decreased, whereas the use of more than about 0.2% of cationic surface active agent is uneconomical.

In some instances the solubility of the cationic surface active agent in water will be a determining factor on the upper limit of the amount of agent which may be used in the compositions of the present invention.

The compounds of the present invention may be diluted either with water or lower alkanols such as methanol, ethanol, isopropanol and the like, or with combinations to form aqueous-alcoholic solutions. The pH of the final solution may be either on the acid side or the alkaline side and may be varied over a wide range of from about 4.0 to about 9.0, though it is preferred to have the pH in the range of from about 5.0 to 8.0.

The alcoholic and aqueous solutions of the dialdehyde and cationic surface active agent generally have an acid pH which may be readily changed to an alkaline pH by the addition of minor amounts of alkalinating agents or buffering agents such as the alkali metal carbonates, bicarbonates, phosphates, borates or certain amines, for example, sodium bicarbonate, potassium bicarbonate, sodium carbonate, diethylaminoethanol, dibutylamine, and the like. The excellent activity of the compositions of the present invention over the wide pH range makes them suitable for use in all types of environments and with most types of materials; furthermore, the wide pH range allows the solutions to be stored for long periods of time without detracting from their sporicidal activity.

The choice of aqueous, alcoholic, or aqueous-alcoholic solutions will depend not only on the novel compositions used but also on the material to be sterilized. For instance, it is known that lower alkanols have a deterioration effect on materials such as rubber, certain plastics, lenses and cements. Articles of this type when exposed to alcoholic solutions on a repetitive basis lose many of their original characteristics because of corrosion, delamination, etc. Further, if the material to be sterilized has not been thoroughly cleansed possible protein precipitation may occur with the danger of spore encapsulation. Such problems of course may be minimized by the use of aqueous solutions. Furthermore, these different detrimental effects can be eliminated by control of the pH range of the sterilizing solution.

Other substances may be added to the novel compositions of the present invention provided they have no detrimental effect on the sporicidal activity of the compositions. Examples of such substances would be coloring materials, pH indicators, buffers, anti-corrosion agents, dyes, and the like.

The following examples are given to further illustrate the invention. They are given primarily for the purposes of illustration and should not be construed as limiting the invention to the details given.

*Example I*

A novel sporicidal composition of the present invention is prepared by mixing 9.6 grams of 25% aqueous glutaraldehyde and 0.1 gram of cetylpyridinium chloride in a sufficient quantity of distilled water to make a final 100 ml. volume mixture. The mixture is buffered to a pH of 5.0 with sodium bicarbonate. The solution is tested for its germicidal and sporicidal properties in accordance with the official sporicidal test adopted by the Association of Official Agricultural Chemists (A.O.A.C. 1961). Briefly, this test comprises exposing porcelain cylinders carrying bacteria or bacterial spores to the test solution for different periods of time at a temperature of 20° C. and then transferring the cylinders to a subculture medium known to support the growth of such microorganisms. The cultures (including controls) are incubated at 37° C. for 1 week or 2 weeks as the case may be. If no growth is observed in the subculture media after the 2-week period the solution is considered bactericidal or sporicidal (as the case may be). The spores against which the solutions are tested are generally U.S.D.A. strains of *Bacillus globigii, Bacillus subtilis, Clostridium tetani* and *Clostridium welchii*. Standard tests, known in the art, are conducted to rule out bacteriostasis or sporistasis.

The solution is found to kill *Bacillus globigii, Bacillus subtilis, Clostridium tetani* and *Clostridium welchii* organisms in a period of less than one-half hour.

For comparative purposes similar solutions are made. The first solution contains 9.6 grams of 25% aqueous glutaraldehyde mixed in sufficient distilled water to make a 100 ml. volume mixture, buffered to a pH of 7.8 with sodium bicarbonate. (Aldehydes are most active at the alkaline pH's). The second solution tested comprises 0.1 gram of cetylpyridinium chloride dissolved in sufficient distilled water to make a 100% volume mixture.

The solution containing only the glutaraldehyde when tested in the manner previously described is found to kill *Bacillus globigii, Bacillus subtilis, Clostridium tetani* and *Clostridium welchii* organisms in a period of from about 2 to 3 hours. The solution containing only the cetylpyridinium chloride when tested as previously described is found to kill *Bacillus globigii* and *Clostridium welchii* organisms in less than six hours but does not kill *Bacillus subtilis* and *Clostridium tetani* organisms even after 18 hours exposure.

*Example II*

Aqueous solutions containing various concentrations of glutaraldehyde and containing 0.1% of cetylpyridinium chloride and buffered to a pH of from about 8 to 9 are tested for germicidal and sporicidal properties as described in Example I. The following table gives the sporicidal activity of the solutions:

TABLE 1.—VARIOUS CONCENTRATIONS OF GLUTARALDEHYDES

| Glutaralde-hyde, Concentration, Percent | Cetylpyridinium Chloride, Concentration, Percent | Time in Hours to Kill | | | |
|---|---|---|---|---|---|
| | | B. globigii | B. subtilis | Cl. tetani | Cl. welchii |
| 0.3 | 0.1 | <1 | <1 | 2-3 | <1 |
| 0.6 | 0.1 | <1 | 3-4 | <1 | <1 |
| 1.2 | 0.1 | <1 | 1-2 | <1 | <1 |
| 2.4 | 0.1 | <0.5 | <0.5 | <0.5 | <0.5 |

*Example III*

Aqueous solutions of various concentrations of cetylpyridinium chloride all containing 2.4% of glutaraldehyde and buffered to a pH of from 8 to 9 are tested for their germicidal and sporicidal properties as described in Example I.

The following table gives the sporicidal activity of the solutions:

TABLE 2.—VARIOUS CONCENTRATIONS OF CETYLPYRIDINIUM

| Cetyl-pyridinium Chloride, Concentration, Percent | Glutaraldehyde, Concentration, Percent | Time in Hours to Kill | | | |
|---|---|---|---|---|---|
| | | B. globigii | B. subtilis | Cl. tetani | Cl. welchii |
| 1.0 | 2.4 | <0.5 | <0.5 | <0.5 | <0.5 |
| 0.5 | 2.4 | <0.5 | <0.5 | <0.5 | <0.5 |
| 0.1 | 2.4 | <0.5 | <0.5 | <0.5 | <0.5 |
| 0.05 | 2.4 | <0.5 | <0.5 | <0.5 | <0.5 |

*Example IV*

An aqueous solution containing 2.4% of glyoxal (oxaldehyde) and 0.1% of cetyl pyridinium chloride buffered to a pH of about 8.0 with sodium bicarbonate is tested for sporicidal activity as described in Example I. The solution is found to kill *Bacillus globigii, Bacillus subtilis* and *Clostridium welchii* organisms within one-half hour exposure while it kills *Clostridium tetani* organisms after about 5 to 6 hours' exposure.

*Example V*

A series of aqueous solutions containing 2.4% glutaraldehyde and 0.05% or 0.1% of various cationic surface active agents, in accordance with the present invention, are made and buffered to a pH of about 8.5 and 9 with sodium bicarbonate. The solutions are tested for germicidal and sporicidal activities. The following are the results obtained with the various agents:

TABLE 3.—VARIOUS CATIONIC SURFACE ACTIVE AGENTS

| Cationic Surface Active Agent | Concentration | Time in Hours to Kill | |
|---|---|---|---|
| | | B. subtilis | Cl. tetani |
| Benzethonium chloride | 0.05 | <0.5 | <0.5 |
| Dequalinium acetate | 0.05 | 0.5-1 | <0.5 |
| Cetyldimethylammonium bromide | 0.05 | <0.5 | <0.5 |
| Dimethyldodecyl (2-phenoxyethyl) ammonium bromide | 0.05 | <0.5 | <0.5 |
| Laurylpyridinium chloride | 0.05 | 1-2 | <0.5 |
| Cetyltrimethylammonium bromide | 0.10 | <0.5 | <0.5 |
| Cetyltrimethylammonium p-toluene sulfonate | 0.05 | 1-2 | <0.5 |
| Cetyldimethylbenzylammonium chloride | 0.05 | 1-2 | <0.5 |

*Example VI*

A novel sporicidal composition of the present invention is prepared by dissolving 9.6 grams of 25% aqueous glutaraldehyde and 0.1 gram of cetylpyridinium chloride in a sufficient quantity of distilled water to make a final 30% volume to which a sufficient quantity of isopropyl alcohol is added to make a 100% volume mixture containing a final volume of 70% isopropyl alcohol. The solution is tested as described in Example I and is found to kill *Bacillus subtilis* organisms in less than one-half hour exposure.

*Example VII*

Sporicidal compositions of the present invention are tested for germicidal and sporicidal activity at various pH's as given in the following table and are shown to have similar activity over the pH range of 4.0 to 9.0.

TABLE 4.—ACTIVITY AT VARIOUS pH's

| Glutaraldehyde, Concentration, percent | Cetylpyridinium Chloride, Concentration, percent | Diluent | pH | Time In Hours To Kill | | | |
|---|---|---|---|---|---|---|---|
| | | | | B. globigii | B. subtilis | Cl. tetani | Cl. welchii |
| 2.4 | 0.1 | Water | 3.95 | <2 | <2 | 3-4 | <2 |
| 2.4 | 0.1 | do | 5.0 | <0.5 | <0.5 | <0.5 | <0.5 |
| 2.4 | 0.1 | do | 7.9 | <0.5 | <0.5 | <0.5 | <0.5 |
| 2.4 | 0.05 | do | 8.75 | <0.5 | <0.5 | <0.5 | <0.5 |

Example VIII

A test solution containing 2.4% glutaraldehyde and 0.1% of cetylpyridinium chloride and buffered to a pH of 7.9 with sodium bicarbonate is allowed to stand for two weeks and is tested for germicidal and sporicidal activity. The solution kills *Bacillus globigii, Bacillus subtilis, Clostridium tetani* and *Clostridium welchii* organisms within one-half hour of exposure. A similar solution is aged for 10 months at 55° C. and then tested for sporicidal activity. The solution kills *Bacillus globigii, Bacillus subtilis, Clostridium welchii* organisms in less than 2 hours and *Clostridium tetani* organisms in 3 to 4 hours' time.

Although several specific examples of the inventive concept have been described for purposes of illustration, the invention should not be construed as limited thereby nor to the specific features mentioned therein except as the same may be included in the claims appended hereto. It is understood that changes, modifications, and variations may be made without departing from the spirit and scope of the present invention.

What is claimed is:

1. A sporicidal composition comprising from about 0.1% to about 2% of a saturated dialdehyde containing from 2 to 6 carbon atoms and from about .01% to .1% of a cationic surface active agent.

2. A sporicidal composition comprising from about 0.1% to about 2% of a saturated dialdehyde containing from 2 to 6 carbon atoms and from about .01% to .1% of a quaternary ammonium salt.

3. A sporicidal composition comprising from about .1% to about 2% of glutaraldehyde and from about .01% to .1% cetylpyridinium chloride.

4. An aqueous sporicidal composition comprising from about 0.1% to about 2% of a saturated dialdehyde containing from 2 to 6 carbon atoms and from about .01% to .1% of a quaternary ammonium salt.

5. An aqueous sporicidal composition comprising from about .1% to about 2% of glutaraldehyde and from about .01% to .1% of cetylpyridinium chloride.

6. A sporicidal composition comprising from about .1% to about 2% of a saturated dialdehyde containing from 2 to 6 carbon atoms, from about .01% to .1% of a cationic surface active agent and a sufficient quantity of a lower alkanol to make a final alcoholic concentration of from about 60% to about 70%.

7. A method for disinfecting medical and surgical instruments and household objects which comprises: subjecting said objects to treatment with a composition comprising a saturated dialdehyde containing from 2 to 6 carbon atoms and a cationic surface active agent.

8. A method for disinfecting medical and surgical instruments and household objects which comprises: subjecting said objects to treatment with a composition comprising a saturated dialdehyde containing from 2 to 6 carbon atoms and a quaternary ammonium salt.

9. A method for disinfecting medical and surgical instruments and household objects which comprises: subjecting said objects to treatment with a composition comprising glutaraldehyde and a cationic surface active agent.

10. A method for disinfecting medical and surgical instruments and household objects which comprises: subjecting said objects to treatment with a composition comprising glutaraldehyde and a quaternary ammonium salt.

11. A method for disinfecting medical and surgical instruments and household objects which comprises: subjecting said objects to treatment with a composition comprising from about 0.1% to 2% of glutaraldehyde and from about .01% to .1% of a quaternary ammonium salt.

References Cited by the Examiner

UNITED STATES PATENTS

| | | | |
|---|---|---|---|
| 2,295,504 | 9/1942 | Shelton | 167—30 |
| 2,314,111 | 3/1943 | Tucker et al. | 167—30 |
| 2,317,999 | 5/1943 | Leuchs | 167—30 |
| 2,666,010 | 1/1954 | Stayner | 167—30 |
| 2,694,663 | 11/1954 | Stayner | 167—30 |
| 2,775,067 | 12/1956 | Meuli | 167—22 |
| 2,889,243 | 6/1959 | Underwood et al. | 167—22 |
| 3,016,328 | 1/1962 | Pepper et al. | 167—22 |
| 3,057,775 | 10/1962 | Rendon | 167—22 |

JULIAN S. LEVITT, *Primary Examiner.*

GEORGE A. MENTIS, *Assistant Examiner.*

UNITED STATES PATENT OFFICE
CERTIFICATE OF CORRECTION

Patent No. 3,282,775

November 1, 1966

Albert Adam Stonehill

It is hereby certified that error appears in the above numbered patent requiring correction and that the said Letters Patent should read as corrected below.

Column 3, line 33, beginning with "pH" strike out all to and including "etc." in line 38, same column 3, and insert instead -- in the novel compositions along with the cationic agent the anionics or non-ionics do not by themselves increase the sporicidal activity of the compositions or produce the other desired results, i.e., activity over a broad pH range, stability, etc. --.

Signed and sealed this 5th day of September 1967.

(SEAL)
Attest:

ERNEST W. SWIDER
Attesting Officer

EDWARD J. BRENNER
Commissioner of Patents